(12) United States Patent
Dournel et al.

(10) Patent No.: US 6,660,709 B1
(45) Date of Patent: Dec. 9, 2003

(54) COMPOSITIONS COMPRISING 1,1,1,3,3-PENTAFLUOROBUTANE AND USE OF THESE COMPOSITIONS

(75) Inventors: Pierre Dournel, Brussels (BE); Pierre Barthelemy, Pietrebais (BE)

(73) Assignee: Solvay (Societe Anonyme) (BE)

( * ) Notice: Subject to any disclaimer, the term of this patent is extended or adjusted under 35 U.S.C. 154(b) by 0 days.

(21) Appl. No.: 09/868,403

(22) PCT Filed: Dec. 10, 1999

(86) PCT No.: PCT/EP99/09798

§ 371 (c)(1),
(2), (4) Date: Jul. 30, 2001

(87) PCT Pub. No.: WO00/36046

PCT Pub. Date: Jun. 22, 2000

(30) Foreign Application Priority Data

Dec. 12, 1998 (WO) ................. PCT/EP98/08160
Mar. 12, 1999 (EP) ............................. 99200762

(51) Int. Cl.⁷ ................. C11D 3/16; C09K 5/04
(52) U.S. Cl. ................. 510/461; 510/415; 252/67
(58) Field of Search ................. 510/415, 461; 252/67

(56) References Cited

U.S. PATENT DOCUMENTS

| | | | |
|---|---|---|---|
| 5,445,757 A | 8/1995 | Pennetreau | 252/171 |
| 5,478,492 A | 12/1995 | Barthelemy et al. | 252/171 |
| 5,674,825 A | 10/1997 | Buchwald et al. | 510/177 |
| 5,688,431 A | 11/1997 | Minor | 252/67 |
| 5,714,298 A | 2/1998 | Barthelemy et al. | 430/124 |
| 5,769,935 A | 6/1998 | Swan | 106/311 |
| 5,814,595 A | 9/1998 | Flynn et al. | 510/411 |
| 5,948,174 A * | 9/1999 | Barthelemy et al. | 134/42 |
| 5,973,055 A | 10/1999 | Michaud et al. | 524/462 |
| 6,080,799 A | 6/2000 | Kruecke et al. | 521/131 |
| 6,174,850 B1 * | 1/2001 | Michaud | 510/415 |

FOREIGN PATENT DOCUMENTS

| | | |
|---|---|---|
| AU | 732611 | 3/1998 |
| BE | 1 007 543 | 8/1995 |
| DE | 197 25 360 | 6/1998 |
| EP | 0784238 | 7/1997 |
| EP | 0851016 | 7/1998 |
| EP | 0863194 | 9/1998 |
| EP | 980 890 | 2/2000 |
| EP | 980 910 | 2/2000 |
| JP | 5531096 | 3/1979 |
| WO | 96/22356 | 7/1996 |
| WO | 9630487 | 10/1996 |
| WO | 96/36688 | 11/1996 |
| WO | 96/36689 | 11/1996 |
| WO | 97/28229 | 8/1997 |
| WO | 99/312214 | 6/1999 |
| WO | 00/56833 | 9/2000 |

OTHER PUBLICATIONS

Ullmann's Encyclopedia of Industrial Chemistry, 5$^{th}$ Edition, 1987, vol. A8, pp. 338–350.

* cited by examiner

Primary Examiner—John Hardee
(74) Attorney, Agent, or Firm—Connolly Bove Lodge & Hutz LLP

(57) ABSTRACT

Compositions comprising 1,1,1,3,3-pentafluorobutane and more than 5% by weight of at least one non-flammable fluoro compound, and use thereof. No figures.

20 Claims, No Drawings

COMPOSITIONS COMPRISING 1,1,1,3,3-PENTAFLUOROBUTANE AND USE OF THESE COMPOSITIONS

The invention relates to compositions comprising 1,1,1, 3,3-pentafluorobutane and to their use, for example, as solvents, in particular for drying or degreasing, or as refrigerants.

International agreements aimed at protecting the stratospheric ozone layer require that the use of chlorofluorocarbons (CFCs) and hydrochlorofluorocarbons (HCFCs) be gradually reduced or even stopped. Compounds of this type are used, inter alia, as solvents or as refrigerants. CFC-113, for example, is used as a solvent for degreasing or cleaning surfaces. More recently, HCFC-141b has been used for these applications. The latter compound is also used with surfactants, in drying agents. CFC-11 and HCFC-123 are used, for example, as refrigerants in turbocompressors.

It is known practice to use 1,1,1,3,3-pentafluorobutane (HFC-365mfc) as a replacement product which respects the ozone layer in applications as a solvent. However, the use of 1,1,1,3,3-pentafluorobutane requires precautions in order to take account of the flammable nature of the product. It has been proposed to use 1,1,1,3,3-pentafluorobutane in compositions with a specific surfactant and pentafluoropropanol or tridecafluorooctanol (EP-A 863 194). However, these compositions have the drawback of being limited as regards the polarity of the possible mixtures. This limits their capacity to dissolve surfactants. Furthermore, with pentafluoropropanol, increased solubility in semi-aqueous media should be expected, which is unacceptable for certain applications. The high boiling point of the fluoro alcohols used also leads to an enrichment in HFC-365mfc in the gas phase which makes the vapours flammable. Consequently, the compositions proposed should not be used in drying machines.

The invention is directed towards overcoming these problems.

A subject of the invention is thus compositions comprising 1,1,1,3,3-pentafluorobutane (HFC-365mfc) and more than 5% by weight of at least one non-flammable fluoro compound selected from perfluorocarbons, hydrofluorocarbons comprising more than 3 carbon atoms, fluoroamines and fluoro ethers.

It has been found, surprisingly, that the compositions according to the invention have good properties as regards their flammability and good technical properties for a wide range of applications. 1,1,1,3,3-Pentafluorobutane has the particular advantage of being miscible with non-flammable fluoro compounds and of being compatible with additives or solvents usually used in applications such as those mentioned above.

The expressions "non-flammable fluoro compound" and "non-flammable composition" are intended to denote any compound or composition which does not have a determined flash point according to ISO standard 1523.

The non-flammable hydrofluorocarbons (HFCs) and perfluorocarbons used in the compositions according to the invention can be linear, branched or cyclic and generally contain 4, 5, 6, 7, 8, 9 or 10 carbon atoms. Among the hydrofluorocarbons, those comprising at least 5 carbon atoms are suitable for use. 1,1,1,2,3,4,4,5,5,5-Decafluoropentane (HFC-43-10mee) is particularly preferred. Among the perfluorocarbons, those comprising at least 5 carbon atoms are suitable for use. Perfluoropentane and perfluorohexane are preferred. Perfluoropentane and perfluorohexane are usually used in the form of technical mixtures of isomers, as sold, for example, by 3M under the respective names PF5050 for perfluoropentane and PF5060 for perfluorohexane.

The non-flammable fluoro ethers and fluoroamines which can be used in the compositions according to the invention can be linear, branched or cyclic and generally contain 3, 4, 5, 6, 7, 8, 9 or 10 carbon atoms. Among the fluoro ethers, those comprising at least 4 carbon atoms are suitable for use. Perfluorobutyl methyl ether is particularly preferred. Among the fluoroamines, those comprising at least 4 carbon atoms are suitable for use. Perfluorotriethylamine is particularly preferred.

Generally, the non-flammable fluoro compounds have a boiling point at 101.3 kPa of greater than or equal to 15° C. Preferably, the boiling point is greater than or equal to 20° C. Generally, the boiling point is less than or equal to 130° C. at 101.3 kPa. Usually, the boiling point is less than or equal to 100° C. Preferably the boiling point is less than or equal to 85° C.

The F/H numerical ratio (number of fluorine atoms in the molecule divided by the number of hydrogen atoms in the molecule) of the non-flammable fluoro compounds is greater than 2. An F/H numerical ratio of greater than or equal to 2.5 is suitable. Preferably, the F/H numerical ratio is greater than or equal to 3.

The amount of non-flammable fluoro compounds is greater than 5% by weight relative to the mixture consisting of 1,1,1,3,3-pentafluorobutane and non-flammable fluoro compounds. Usually, an amount of greater than or equal to 10% by weight is used. An amount of greater than or equal to 20% by weight is preferred. An amount of greater than or equal to 25% by weight is suitable for use. An amount of greater than or equal to 30% by weight gives good results. In a particularly preferred manner, the effective amount of non-flammable fluoro compound used is that which makes the composition non-flammable, i.e. the composition has no determined flash point according to ISO standard 1523. Generally, the amount of non-flammable fluoro compounds in the compositions according to the invention is not more than 90% by weight.

Preferred compositions according to the invention comprise, as non-flammable compound, at least perfluoropentane, perfluorohexane, perfluorobutyl methyl ether or a mixture thereof. A preferred variant of the compositions according to the invention relates to compositions comprising 1,1,1,3,3-pentafluorobutane and at least one perfluorocarbon in proportions in which they form an azeotrope or a pseudo-azeotrope.

Basically, the thermodynamic state of a fluid is defined by four interdependent variables: the pressure (P), the temperature (T), the composition of the liquid phase (X) and the composition of the gas phase (Y). A true azeotrope is a specific system of 2 or more components for which, at a given temperature and a given pressure, the composition of the liquid phase X is exactly equal to the composition of the gas phase Y. A pseudo-azeotrope is a system of 2 or more components for which, at a given temperature and a given pressure, X is substantially equal to Y. In practice, this means that the constituents of such azeotropic and pseudo-azeotropic systems cannot be readily separated by distillation and consequently there is no enrichment in flammable compound in the gas phase.

For the purposes of the present invention, the expression "pseudo-azeotropic mixture" means a mixture of two constituents whose boiling point (at a given pressure) differs from the boiling point of the true azeotrope by a maximum of 0.5° C. Mixtures whose boiling point differs from the boiling point of the true azeotrope by a maximum of 0.2° C. are preferred. Mixtures whose boiling point differs from the boiling point of the true azeotrope by a maximum of 0.1° C. are particularly preferred.

1,1,1,3,3-Pentafluorobutane and perfluoropentane form a binary azeotrope or pseudo-azeotrope when their mixture contains from 50 to 87% by weight approximately of perfluoropentane. Binary compositions containing from 50 to 70% by weight approximately of perfluoropentane are preferred. Binary compositions containing from 50 to 60% by weight approximately are particularly preferred. Binary compositions containing from 65 to 80% by weight approximately of perfluoropentane are also preferred. Binary compositions containing from 70 to 78% by weight approximately are particularly preferred. At a pressure of 100.1±0.2 kPa, the binary composition consisting essentially of about 26% by weight of 1,1,1,3,3-pentafluorobutane and about 74% by weight of perfluoropentane constitutes a true azeotrope whose boiling point is about 24.4° C.

1,1,1,3,3-Pentafluorobutane and perfluorohexane form a binary azeotrope or pseudo-azeotrope when their mixture contains from 20 to 60% by weight approximately of perfluorohexane. Binary compositions containing from 25 to 45% by weight approximately of perfluorohexane are preferred. Binary compositions containing from 32 to 42% by weight approximately of perfluorohexane are particularly preferred. Binary compositions containing from 35 to 40% by weight approximately of perfluorohexane are most particularly preferred. At a pressure of 101.2±0.5 kPa, the binary composition consisting essentially of about 64% by weight of 1,1,1,3,3-pentafluorobutane and about 36% by weight of perfluorohexane constitutes a true azeotrope whose boiling point is about 36.4° C. This composition is most particularly preferred.

The invention also relates to compositions comprising 1,1,1,3,3-pentafluorobutane, at least one non-flammable fluoro compound and at least one non-fluoro organic solvent. The non-flammable fluoro compounds mentioned above are preferred as non-flammable fluoro compounds.

Non-fluoro organic solvents which are suitable for use, for example, are hydrocarbons, chlorohydrocarbons, alcohols, esters, ketones or ethers.

Halogenated hydrocarbons, and aliphatic, alicyclic or aromatic esters or ketones are also suitable as non-fluoro organic solvent.

The hydrocarbons which can be used in the compositions according to the invention may be linear, branched or cyclic and generally contain 3, 4, 5, 6, 7, 8, 9, 10, 11 or 12 carbon atoms. Hydrocarbons comprising at least 5 carbon atoms are suitable for use. The hydrocarbons preferably comprise at least 6 carbon atoms. Among the alkanes or alkenes, compounds comprising from 5 to 12 carbon atoms are preferred. n-Hexane, n-heptane and n-octane are suitable for use. Among the aromatic hydrocarbons which are preferred are those comprising at least one alkyl substituent on a benzene ring. Toluene, 1,2-xylene, 1,3-xylene, 1,4-xylene or mixtures thereof are most particularly preferred.

The chlorohydrocarbons which can be used in the compositions according to the invention may be linear, branched or cyclic and generally contain 1, 2, 3, 4, 5, 6, 7, 8, 9 or 10 carbon atoms. Chlorohydrocarbons comprising 1, 2, 3 or 4 carbon atoms are suitable for use. The chlorohydrocarbons preferably comprise 1 or 2 carbon atoms. Among the chloroalkanes, dichloromethane, trichloromethane and 1,2-dichloroethane are preferred. Among the chloroalkenes, perchloroethylene and 1,2-dichloroethylene are preferred, trans-1,2-Dichloroethylene is most particularly preferred.

1,2-Dichloroethylene has the property of forming azeotropic or pseudo-azeotropic mixtures with 1,1,1,3,3-pentafluorobutane, which can have advantages for certain applications. Azeotropic or pseudo-azeotropic mixtures as well as ternary azeotropic or pseudo-azeotropic mixtures also comprising an alkanol are described in U.S. Pat. No. 5 478 492 in the name of the Applicant, the content of which is incorporated by reference into the present patent application.

The alcohols which can be used in the compositions according to the invention may be linear, branched or cyclic and generally contain 1, 2, 3, 4, 5, 6, 7, 8, 9 or 10 carbon atoms. Alcohols comprising 1, 2, 3, 4 or 5 carbon atoms are suitable for use. The alcohols preferably comprise 1, 2, 3 or 4 carbon atoms. Among the alkanols, methanol, ethanol, n-propanol, isopropanol, n-butanol, isobutanol and tert-butanol are preferred. Methanol, ethanol, isopropanol and isobutanol give good results. Isobutanol is most particularly preferred.

Methanol has the property of forming azeotropic or pseudo-azeotropic mixtures with 1,1,1,3,3-pentafluorobutane, which can have advantages for certain applications. The azeotropic or pseudo-azeotropic mixtures contain from 93 to 99% by weight of 1,1,1,3,3-pentafluorobutane and from 1 to 7% of methanol. The true azeotrope contains about 96.2% by weight of 1,1,1,3,3-pentafluorobutane and about 3.8% by weight of methanol.

Ethanol has the property of forming azeotropic or pseudo-azeotropic mixtures with 1,1,1,3,3-pentafluorobutane, which can have advantages for certain applications. The azeotropic or pseudo-azeotropic mixtures are described in U.S. Pat. No. 5, 445, 757 in the name of the Applicant, the content of which is incorporated by reference into the present patent application.

The esters which can be used in the compositions according to the invention can be linear, branched or cyclic and generally contain 2, 3, 4, 5, 6, 7, 8, 9 or 10 carbon atoms. Esters comprising 4, 5, 6, 7, 8, or 9 carbon atoms are suitable for use. Preferably, the esters are derivatives of a carboxylic acid comprising at least 2 carbon atoms. Preferably, the esters are derivatives of an alkanol, selected from the group consisting of methanol, ethanol, n-propanol, isopropanol, n-butanol, isobutanol and tert-butanol. Ethyl acetate, ethyl butyrate and ethyl caproate are suitable for use.

The ketones which can be used in the compositions according to the invention can be linear, branched or cyclic and generally contain 3, 4, 5, 6, 7, 8, 9 or 10 carbon atoms. Ketones comprising 3, 4, 5, 6, 7 or 8 carbon atoms are suitable for use. Among the ketones, acetone, 2-butanone, 2- or 3-pentanone, methyl isobutyl ketone, diisopropyl ketone, cyclohexanone and acetophenone are preferred. Methyl isobutyl ketone is particularly preferred.

The ethers which can be used in the compositions according to the invention can be linear, branched or cyclic and generally contain 2, 3, 4, 5, 6, 7, 8, 9 or 10 carbon atoms. Ethers comprising 4, 5, 6, 7, 8 or 9 carbon atoms are suitable for use. Among the aliphatic or alicyclic ethers, diethyl ether, methyl isopropyl ether, diethylene glycol monomethyl ether, diethylene glycol dimethyl ether, tetrahydrofuran and 1,4-dioxane are preferred.

It has been found that the compositions according to the invention comprising at least one non-fluoro organic solvent are particularly suitable for applications as solvents for drying or degreasing The term "solvent for drying" refers to applications in which the compositions according to the invention are used to remove the water present at the surface of solid articles. Specifically, it is possible to achieve a wide variety of polarities of different solvents while at the same time conserving the advantages as regards the non-flammability of the compositions. Most particularly, these compositions make it possible to achieve good properties of solubilization of surfactants required, for example, for solvents for drying.

Flammable or non-flammable solvents can be used. In the case of a flammable solvent, it is preferred to use a solvent which has a flash point of greater than or equal to 0° C. More particularly, a flash point of greater than or equal to 10° C. is preferred. Solvents with a flash point of greater than or equal to 20° C. are most particularly preferred.

In the case of a flammable non-fluoro organic solvent, an effective amount of non-flammable fluoro compound is preferably used so as to obtain a non-flammable composition according to the invention.

For non-flammable non-fluoro solvents, the boiling point at 101.3 kPa is not critical. Generally, the non-flammable solvents have a boiling point at 101.3 kPa of greater than or equal to 15° C. Preferably, the boiling point is greater than or equal to 20° C. Generally, the boiling point is less than or equal to 250° C. at 101.3 kPa. Usually, the boiling point is less than or equal to 200° C.

When a flammable non-fluoro organic solvent is used, a solvent with a boiling point of greater than or equal to 30° C. is generally used. Usually, the boiling point is greater than or equal to 40° C. Preferably, the boiling point is greater than or equal to 50° C. In a particularly preferred manner, the boiling point is greater than or equal to 60° C. The reason for this is that this avoids an enrichment of flammable non-fluoro organic solvent in the gas phase and consequently avoids the formation of flammable gaseous mixtures.

According to the intended application, a non-fluoro organic solvent which is miscible or immiscible with water can be used. Solvents which are essentially immiscible with water are suitable, for example, for a drying application.

The amount of non-fluoro organic solvent in a composition according to the invention comprising 1,1,1,3,3-pentafluorobutane, at least one non-flammable fluoro compound and at least one non-fluoro organic solvent can be chosen as a function of the desired polarity and flammability of the composition. Generally, this content is not more than 20% by weight. Preferably, it is not more than 10% by weight. When a non-fluoro organic solvent is present, its content is generally at least 1% by weight. Preferably, it is at least 2% by weight.

Particular examples of the compositions according to the invention comprise 1,1,1,3,3-pentafluorobutane and a non-fluoro organic solvent in proportions in which they form an azeotrope or a pseudo-azeotrope.

The compositions according to the invention optionally contain a surfactant. Any surfactant which is well known per se and which is compatible with the compositions according to the invention can be used. Advantageously, the surfactant is used with compositions according to the invention comprising at least one non-fluoro organic solvent, as described above. The reason for this is that these compositions are particularly suitable for achieving a good solubility of the surfactant while at the same time retaining good properties as regards the non-flammability of the compositions.

A number of surfactants which can be used in the compositions according to the invention are described, for example, in Ullmann's Encyclopedia of Industrial Chemistry, 5$^{th}$ edition, 1987, vol. A8, pp. 338–350. Cationic, anionic, nonionic and amphoteric surfactants can be used. It is possible, for example, to use fatty acids, fatty esters, alkylbenzenesulphonates, alkanesulphonates, α-olefin sulphonates, α-sulphonated fatty acid esters (SES), alkyl sulphates, alkyl ether sulphates, quaternary ammonium compounds, polyethylene glycol alkyl ethers, polyethylene glycol phenyl ethers, fatty acid alkanolamides, polyglycol fatty alkyl ethers, ethylene oxide and propylene oxide block copolymers, alkylbetaines, alkylsulphobetaines, tetraalkylammonium salts of mono- or dialkylphosphoric acids or surfactants comprising at least one imidazoline group. It is also possible to use surfactants such as those described above containing at least one fluorine substituent. More specifically, surfactants comprising at least one polyfluoro alkyl chain or a polyfluoro aromatic substituent can be used.

In compositions according to the invention which can be used, in particular, as drying agents, a surfactant of imidazoline type is preferably used. In a particularly preferred manner, the imidazoline corresponds to the formula:

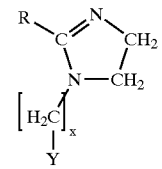

in which R represents an alkyl or alkenyl chain comprising from 2 to 25 carbon atoms, Y represents a hydroxyl or amino group and x is an integer from 1 to 20. Preferably, x is from 1 to 12. Preferably, the chain R comprises from 10 to 20 carbon atoms. The imidazolines in which R represents a chain comprising 11 or 17 carbon atoms and x is equal to 2 are most particularly preferred.

The imidazoline can be in the form of the free base or in the form of a salt, preferably the mono- or dicarboxylate. The carboxylate part is preferably derived from a saturated or unsaturated fatty acid comprising from 4 to 22 carbon atoms. It is preferred to use the imidazoline in free form or in the form of the monocarboxylate salt.

A surfactant of alkylbenzenesulphonate type is also particularly preferred. This surfactant often comprises an alkyl chain comprising from 4 to 22 and preferably from 10 to 14 carbon atoms. Dodecylbenzenesulphonate salts, in particular the salts of a quaternary amine, give good results. Isopropylammonium dodecylbenzenesulphonate is particularly preferred.

When a surfactant is present in a composition according to the invention, its content is generally at least 100 ppm (mg/kg). It is often at least 500 ppm. Preferably, it is at least 1000 ppm. Generally, the surfactant content is not more than 5000 ppm. It is often not more than 4000 ppm. Preferably, it is not more than 3000 ppm. When a surfactant of imidazoline type as described above is used, its particularly preferred content is about 2000 ppm. The table below collates, in a non-limiting manner, a number of preferred compositions according to the invention.

TABLE 1

| No. | Content of HFC-365mfc (% by weight) | Content of perfluorohexane (% by weight) | Content of HFC-43-10mee (% by weight) | Content of HFE-7100 (% by weight) | Non-fluoro organic solvent (% by weight) |
|---|---|---|---|---|---|
| 1 | 30–60 | — | 40–70 | — | — |
| 2 | 15–45 | — | — | 55–85 | — |
| 3 | 30–49 | 49–60 | — | — | ethyl acetate 2–10 |
| 4 | 30–49 | — | 49–60 | — | ethyl acetate 2–10 |
| 5 | 25–38 | — | — | 60–68 | isopropanol 2–5 |
| 6 | 55–63 | 35–45 | — | — | ethyl acetate 2–10 |
| 7 | 40–50 | — | — | 50–60 | — |

The compositions according to the invention can be used, for example, in solvent applications, as drying agents, as degreasing solvents or as toner-fixing agents. The compositions according to the invention can also be used as refrigerants or heat-exchange fluids.

A drying agent is used, for example, in the electronics or electro-mechanical industry or optionally the cosmetic industry when it is desired to remove the water adsorbed onto a solid surface of an object after an aqueous treatment. The aqueous treatment can consist, for example, of a cleaning operation, optionally in the presence of a surfactant. Generally, after the aqueous treatment, the object is immersed in a drying agent in the boiling state comprising a surfactant, and the surfactant which adheres to the surface of the object is then removed in a washing bath. The compositions according to the invention comprising a surfactant are suitable for the drying operation. The compositions according to the invention which are free of surfactant are suitable for the washing bath intended to remove the surfactant.

A degreasing solvent is used, for example, in the electronics or electromechanical industry to remove the grease adsorbed in particular onto metal components machined with grease. Generally, a component to be degreased is immersed in a bath of boiling degreasing solvent. The compositions according to the invention comprising a non-fluoro organic solvent of high polarity, such as alkanols, in particular methanol or ethanol and/or those which comprise a chlorohydrocarbon, are particularly suitable as degreasing solvents.

A toner-fixing agent serves to fix toner particles onto a support. Toner particles generally comprise a polymer and a pigment. During an electrophotographic printing operation, the particles are attracted to the electrostatic image printed on the support by electrostatic forces. The toner-fixing agent serves to soften the polymer which consequently ensures permanent adhesion of the particles onto the support. The toner-fixing agent is used in the form of vapours, usually generated by vapourizing drops of solvent on a heating plate, for example. The non-flammable compositions according to the invention which have good polymer-solvent power are particularly suitable for this application.

The non-flammable compositions according to the invention can be used advantageously as drying agents in a drying machine or as toner-fixing agents in an industrial laser printer.

The compositions according to the invention are also suitable as refrigerant fluids, in particular as products to replace CFC-11 (trichlorofluoromethane) or as products to replace CFC-113 (1,1,2-trichlorotrifluoroethane), in particular for applications with a turbocompressor. Turbocompressors are especially used when it is desired to have available large refrigeration productions for air-conditioning installations, for example, or for the processing industry. Information regarding the applications in refrigeration, heat-exchange fluid and refrigeration with a turbocompressor is contained, for example, in Ullmann's Encyclopedia of Industrial Chemistry, $5^{th}$ edition, 1988, vol. B3, pp. 19-2 to 19-39. Compositions consisting essentially of 1,1,1,3,3-pentafluorobutane and of one or ore non-flammable fluoro compounds selected from perfluorohexane, perfluoropentane and perfluorobutyl methyl ether, especially if these compositions are azeotropic or pseudo-azeotropic, are particularly suitable for this application.

The compositions according to the invention comprising 1,1,1,3,3-pentafluorobutane and perfluoropentane, in particular those containing or consisting of from 10 to 90% by weight of HFC-365mfc and from 90 to 10% by weight of perfluoropentane, are suitable for use as products to replace CFC-11 in applications as refrigerants or heat-exchange fluids. A preferred composition for this application consists of from 25 to 30% by weight of HFC-365mfc and from 75 to 70% by weight of perfluoropentane. A composition containing from 27.0 to 27.2% by weight of 1,1,1,3,3-pentafluorobutane and from 72.8 to 73.0% of perfluoropentane is most particularly preferred.

The compositions according to the invention comprising 1,1,1,3,3-pentafluorobutane and perfluorohexane, in particular those containing or consisting of from 10 to 90% by weight of HFC-365mfc and from 90 to 10% by weight of perfluorohexane; those comprising 1,1,1,3,3-pentafluorobutane and perfluorobutyl methyl ether, in particular those containing or consisting of from 10 to 90% by weight of HFC-365mfc and from 90 to 10% by weight of perfluorobutyl methyl ether; and those comprising 1,1,1,3,3-pentafluorobutane, perfluorohexane and perfluorobutyl methyl ether, are suitable for use as products to replace CFC-113 in applications as refrigerants or heat-exchange fluids. A preferred composition for this application consists of from 60 to 65% by weight of HFC-365mfc and from 40 to 35% by weight of perfluorohexane. A composition containing from 61.0 to 62.0% by weight of 1,1,1,3,3-pentafluorobutane and from 38.0 to 39.0% of perfluorohexane are particularly suitable for this application. Another preferred composition for this application consists of from 40 to 60% by weight of HFC-365mfc and from 60 to 40% by weight of perfluorobutyl methyl ether.

The examples given below are intended to illustrate the invention without, however, limiting it.

EXAMPLES 1 and 2

HFC-365mfc/Perfluorohexane and HFC-365mfc/Perfluoropentane Azeotropes

In order to demonstrate the existence of azeotropic or pseudo-azeotropic compositions according to the invention between 1,1,1,3,3-pentafluorobutane and perfluoropentane or perfluorohexane, glass apparatus consisting of a 50-ml boiling flask with a reflux condenser mounted on top was used. The temperature of the liquid was measured by means of a thermometer dipping into the flask.

An accurately determined amount of pure 1,1,1,3,3-pentafluorobutane was heated to the boiling point at a known pressure, and accurately weighed small amounts of perfluorocarbon were gradually introduced into the flask by means of a syringe, via a side tube.

The determination of the pseudo-azeotropic compositions was carried out by reading the change in boiling point of the mixture as a function of its composition.

These measurements were carried out for mixtures containing 1,1,1,3,3-pentafluorobutane and increasing amounts of perfluorohexane (Example 1) or of perfluoropentane (Example 2).

The pressure at which the measurements were taken is given. The change in boiling point of the various compositions as a function of their perfluorocarbon content, expressed as a % by weight, is given in Table 2.

TABLE 2

Pressure: 100.1 ± 0.2 kPa

| HFC-365mfc % by weight | Perfluoropentane PF5050 % by weight | Temperature ° C. |
|---|---|---|
| 100.00% | 0.00% | 39.8 |
| 93.77% | 6.23% | 34 |
| 91.93% | 8.07% | 32.2 |
| 90.05% | 9.95% | 31 |
| 88.20% | 11.80% | 30 |
| 86.40% | 13.60% | 29.6 |
| 83.54% | 16.46% | 29 |
| 80.75% | 19.25% | 28.4 |
| 78.14% | 21.86% | 28 |
| 74.70% | 25.30% | 27.6 |
| 71.38% | 28.62% | 27.2 |
| 67.70% | 32.30% | 26.6 |
| 62.95% | 37.05% | 26 |
| 57.25% | 42.75% | 25.6 |
| 52.57% | 47.43% | 25.2 |
| 50.63% | 49.37% | 25.2 |
| 45.07% | 54.93% | 25 |
| 40.19% | 59.81% | 24.8 |
| 38.46% | 61.54% | 24.6 |
| 31.07% | 68.93% | 24.4 |
| 25.99% | 74.01% | 24.4 |
| 22.92% | 77.08% | 24.4 |
| 20.18% | 79.82% | 24.4 |
| 17.61% | 82.39% | 24.8 |
| 15.44% | 84.56% | 24.8 |
| 13.28% | 86.72% | 24.8 |
| 11.31% | 88.69% | 25.2 |
| 9.41% | 90.59% | 25.8 |
| 7.31% | 92.69% | 26.4 |
| 5.28% | 94.72% | 27.4 |
| 3.49% | 96.51% | 28.4 |
| 2.45% | 97.55% | 29.2 |
| 0.00% | 100.00% | 29.6 |

TABLE 3

Pressure: 101.2 ± 0.5 kPa

| HFC-365mfc % by weight | Perfluorohexane PF5060 % by weight | Temperature ° C. |
|---|---|---|
| 100.00% | 0.00% | 40 |
| 94.61% | 5.39% | 38.8 |
| 93.31% | 6.69% | 38.6 |
| 91.81% | 8.19% | 38.4 |
| 90.23% | 9.77% | 38 |
| 88.33% | 11.67% | 37.8 |
| 86.06% | 13.94% | 37.6 |
| 83.69% | 16.31% | 37.4 |
| 80.81% | 19.19% | 37 |
| 76.52% | 23.48% | 36.8 |
| 71.60% | 28.40% | 36.6 |
| 66.96% | 33.04% | 36.4 |
| 60.88% | 39.12% | 36.4 |
| 53.48% | 46.52% | 36.4 |
| 47.09% | 52.91% | 36.6 |
| 43.65% | 56.35% | 37 |
| 42.05% | 57.95% | 36.8 |
| 36.42% | 63.58% | 37.6 |
| 29.55% | 70.45% | 38.2 |
| 26.12% | 73.88% | 38.8 |
| 23.01% | 76.99% | 39.2 |
| 20.59% | 79.41% | 39.8 |
| 18.56% | 81.44% | 40.4 |
| 16.61% | 83.39% | 41.2 |
| 14.77% | 85.23% | 42.4 |
| 13.09% | 86.91% | 43.6 |
| 11.43% | 88.57% | 44.4 |
| 9.80% | 90.20% | 45.6 |
| 8.43% | 91.57% | 46.8 |
| 7.18% | 92.82% | 48 |
| 5.90% | 94.10% | 49.6 |
| 4.63% | 95.37% | 51.2 |
| 3.44% | 96.56% | 53.2 |
| 2.32% | 97.68% | 54.4 |
| 1.16% | 98.84% | 56.4 |
| 0.00% | 100.00% | 57.2 |

The azeotropic or pseudo-azeotropic mixtures HFC-365mfc/perfluorohexane or HFC-365mfc/perfluoropentane are non-flammable.

EXAMPLE 3

A composition according to the invention containing 50 parts by weight of HFC-365mfc, 50 parts by weight of perfluorohexane PF-5060 and 10 parts by weight of ethyl acetate was prepared. The composition was homogeneous. It was subjected to the test according to ISO standard 1523. The composition showed no flash point.

EXAMPLE 4

A composition according to the invention containing 40 parts by weight of HFC-365mfc, 60 parts by weight of perfluorobutyl ether HFE-7100 and 5 parts by weight of isopropanol was subjected to the test according to ISO standard 1523. The composition showed no flash point.

EXAMPLE 5

Solubility of the surfactant Imidazoline 18NH (N-(2-aminoethyl)-2-n-octadecylimidazoline) in ternary mixtures.

0.026 g of Imidazoline 18NH was dissolved in 2 g of xylene (technical-grade mixture of isomers) and 20 g of a mixture containing 13 g of HFC-365mfc and 7 g of perfluorohexane were added. The homogeneous solution obtained contains 1182 ppm of Imidazoline 18NH. This solution was subjected to a rapid flammability test by attempting to ignite the solution at room temperature using a match. The solution did not ignite.

EXAMPLE 6

The process was performed as in Example 5, replacing the xylene with the same amount of toluene. The homogeneous solution obtained contains 1182 ppm of Imidazoline 18NH. The solution did not ignite in the test described in Example 5.

EXAMPLE 7

0.022 g of Imidazoline 18NH was dissolved in 1 g of isobutanol and 20 g of a mixture containing 13 g of HFC-365mfc and 7 g of perfluorohexane were added. The homogeneous solution obtained contains 1048 ppm of Imidazoline 18NH. The solution did not ignite in the test described in Example 5.

EXAMPLE 8

A PVDF plate of rectilinear geometry with a height of 10 cm, a width of 2 cm and a thickness of 1 cm pierced through its thickness with 20 holes 2 mm in diameter was immersed in water in order to block all the holes.

The plate was dipped for 15 seconds into a drying solution in the boiling state, containing HFC-365mfc (65 parts by weight), perfluorohexane PF-5060 (35 parts by weight), isobutanol (5 parts by weight) and 1610 ppm of Imidazoline 18NH obtained in a similar manner to that of Example 5. The plate was removed and dried in air for 2 minutes. The, dipping/drying operation was repeated 4 times, corresponding to a total dipping time of 60 seconds. At the end of this treatment, all the holes were free of water.

EXAMPLE 9

The process was performed as in Example 8, using a drying solution containing 40 parts by weight of HFC365mfc, 60 parts by weight of perfluorobutyl ether HFE-7100, 5 parts by weight of isobutanol and 2000 ppm of Imidazoline 18NH. After a total dipping time of 60 seconds, 19 of the 20 holes were free of water.

EXAMPLE 10

The process was performed as in Example 8, using a drying solution containing 36.4 parts by weight of HFC365mfc, 54.5 parts by weight of perfluorobutyl ether HFE-7100, 9.1 parts by weight of isobutanol and 2500 ppm of isopropylammonium dodecylbenzenesulphonate. After a total dipping time of 60 seconds, all the holes were free of water.

What is claimed is:

1. A composition comprising 1,1,1,3,3-pentafluorobutane and more than 5% of weight of at least one non-flammable fluoro compound presenting no flash point according to standard ISO standard 1523, selected from hydrofluorocarbons comprising at least 5 carbon atoms.

2. The composition according to claim 1, further comprising at least one non-fluoro organic solvent.

3. The composition according to claim 2, in which the non-fluoro organic solvent is selected from a hydrocarbon, halohydrocarbon, aliphatic ester, alicyclic ester, aromatic ester, ketone, and alcohol or ether.

4. The composition according to claim 3, which the non-fluoro organic solvent is ethyl acetate, 1,2-dichloroethylene, methanol, ethanol, isopropanol or isobutanol.

5. The composition according to claim 2, comprising 1,1,1,3,3-pentafluorobutane and the non-fluoro organic solvent is in proportions in which they form an azeotrope or a pseudo-azeotrope.

6. The composition according to claim 1, further comprising a surfactant.

7. The composition according to claim 6, wherein said surfactant is an imidazoline or alkylbenzenesulphonate type.

8. The composition according to claim 1, wherein said non-flammable fluoro compound is 2,3-dihydrodecafluoropentane (HFC-43-10mee).

9. The composition according to claim 8, wherein said non-flammble fluoro compound is 2,3-dihydrodecafluoropentane (HFC-43-10mee).

10. The composition according to claim 8, wherein the content of 2,3-dihydrodecafluoropentane is from 40% to 70% by weight.

11. A solvent which comprises the composition according to claim 1.

12. A degreasing solvent which comprises the composition according to claim 1.

13. A drying agent which comprises the composition according to claim 1.

14. A toner-fixing agent which comprises the composition according to claim 1.

15. A refrigerant which comprises the composition according to claim 1.

16. A heat exchange fluid which comprises the composition according to claim 1.

17. A composition according to claim 1, which comprises an effective amount of non-flammable fluoro compound which makes the composition non-flammable.

18. A composition according to claim 1, wherein the number of fluorine atoms divided by the number of hydrogen atoms in the molecule of the non-flammable fluoro compound is greater than 2.

19. A composition according to claim 1, wherein the non-flammable hydrofluorocarbon comprises 6, 7, 8, 9 or 10 carbon atoms.

20. The composition according to claim 1, wherein the content of non-flammable flouro compound is from 20% to 90% by weight.

* * * * *